United States Patent
McAdam et al.

(10) Patent No.: US 9,152,138 B2
(45) Date of Patent: Oct. 6, 2015

(54) COMMON COLLABORATION CONTEXT BETWEEN A CONSOLE OPERATOR AND A FIELD OPERATOR

(75) Inventors: Rohan McAdam, Yetholme (AU); Graeme Laycock, Hunters Hill (AU)

(73) Assignee: Honeywell International Inc., Morristown, NJ (US)

( * ) Notice: Subject to any disclaimer, the term of this patent is extended or adjusted under 35 U.S.C. 154(b) by 578 days.

(21) Appl. No.: 13/551,669

(22) Filed: Jul. 18, 2012

(65) Prior Publication Data
US 2014/0025339 A1    Jan. 23, 2014

(51) Int. Cl.
| G06F 15/00 | (2006.01) |
| G05B 19/042 | (2006.01) |
| G06Q 10/06 | (2012.01) |
| G06N 5/02 | (2006.01) |

(52) U.S. Cl.
CPC .............. *G05B 19/0425* (2013.01); *G06N 5/02* (2013.01); *G06Q 10/06* (2013.01)

(58) Field of Classification Search
CPC ....... G05B 19/0425; G06Q 10/06; G06N 5/02
USPC .................................. 702/88; 704/260, 275
See application file for complete search history.

(56) References Cited

U.S. PATENT DOCUMENTS

| 7,496,580 | B2* | 2/2009 | Hajdukiewicz et al. ............... 1/1 |
| 8,700,405 | B2* | 4/2014 | Plocher et al. ................ 704/260 |
| 2005/0114567 | A1 | 5/2005 | Lambrache et al. |
| 2006/0143348 | A1 | 6/2006 | Wilson et al. |
| 2007/0061342 | A1 | 3/2007 | Magdeburger et al. |
| 2007/0260607 | A1* | 11/2007 | Hajdukiewicz et al. ........ 707/10 |
| 2009/0222742 | A1 | 9/2009 | Pelton et al. |
| 2011/0202351 | A1* | 8/2011 | Plocher et al. ................ 704/275 |
| 2011/0225339 | A1 | 9/2011 | Chen |
| 2011/0246708 | A1 | 10/2011 | Li et al. |

* cited by examiner

*Primary Examiner* — Carol S Tsai
(74) *Attorney, Agent, or Firm* — Jetter & Associates, P.A.

(57) ABSTRACT

A method of operating a system (e.g., an industrial pant) that runs a physical process involving a console operator and a plurality of field operators including a first field operator. The first field operator sends a wireless message that reaches the console operator. Responsive to receiving the wireless message, selected information is read from a system database including information for equipment in the system and process event data obtained from or relating to the equipment. The selected information includes the equipment which is proximate to a current location of the first field operator (proximate equipment) and process related data from the proximate equipment. The selected information is displayed on the display device viewable by the console operator. To complete a collaboration, the console operator can provide information relevant to the current location to the first field operator.

20 Claims, 4 Drawing Sheets

| 101 | In a physical system that runs a physical process that includes a console operator and a plurality of field operators including a first field operator, the first field operator sending a wireless message that reaches a console operator. |

| 102 | Responsive to receiving the wireless message, selected information is read from a system database including both configuration information for equipment in the system and process event data obtained from or relating to the equipment. |

| 103 | The selected information is displayed on a display device for viewing by the console operator, which provides the console operator situational awareness proximate to the current location. |

| 104 | The console operator provides information relevant to the current location to the first field operator. |

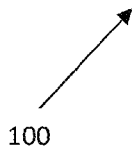

COMMON COLLABORATION CONTEXT BETWEEN A CONSOLE OPERATOR AND A FIELD OPERATOR

FIELD

Disclosed embodiments relate to the field of process control for controlling physical systems, such as industrial plants, which run physical processes involving tangible materials.

BACKGROUND

Physical systems involve at least the transport of a tangible (i.e. real) product, while physical processes further involve the manufacture of a tangible product from one or more materials. The physical system may be a large geographically dispersed system (e.g., a gas pipeline) or complex multi-step process (e.g., for a large oil refinery). Physical systems may be contrasted with virtual systems which lack association with movement or processing of any tangible (i.e. real) materials.

The physical system, typically an industrial plant, may comprise a process automation system which refers to a monitoring and control system, running a set of industrial processes that generate a physical (tangible) product, in which a distributed control system (DCS) may utilize controller elements to monitor and control the industrial processes. Field operators are within the plant around the equipment (sometimes referred to as "assets") within the system. With regard to monitoring, sensors for the industrial processes generate process data (e.g., temperatures, pressures) that is transmitted to the DCS, often in real time. The DCS subsequently displays the process data for human operators generally referred to as "console operators" which monitor and control the industrial process via graphical user interfaces (GUIs) displayed in a console of a control room. The components of the process automation system may be connected by a process control communications network.

Successful operation and management of a physical system, such as an industrial plant, requires collaboration between console operators working in a control room and field operators out within the system/plant. A challenge faced by console operators is that they generally support a plurality of field operators, and are tasked with collaborating with each of them as necessary.

Often such a collaboration will begin with a field operator calling a console operator to request help with a task in the field, such as providing the field operator with directions or additional information (e.g., directing an operator to the correct valve to open). In order to provide the requested directions or additional information, the console operator has to call up information relevant to the particular part of the system in which the field operator is currently located. This collaboration process generally involves the console operator manually and serially selecting and displaying the needed information, then reviewing the information including process schematics, alarm summaries, maintenance data, and information from a variety of sources (e.g., process data, such as sensor data) to enable providing the field operator with directions or additional information relevant to the task at hand. This collaboration process is time consuming due to its manual and serial nature. A related problem concerns a console operator attempting to gain situational awareness for a field operator.

SUMMARY

Disclosed embodiments include methods of operating a physical system that runs a physical process (e.g., an industrial plant) involving a console operator and a plurality of field operators which overcome the time consuming overhead of establishing a collaboration between the console operator and field operators as described above. Responsive to a field operator's wireless message (e.g., a call or text), configuration information for the equipment and process event data obtained from or relating to the equipment relevant to the field operator's current location in the system is efficiently selectively accessed (i.e. read) and then displayed for the console operator, such as process schematics, alarm summaries, maintenance data. Thus, when a field operator contacts a console operator, the console operator can invoke a disclosed algorithm that uses the field operator's location to rapidly display information relevant to equipment proximate to the current location. Disclosed methods thus allow significantly reducing the time taken to enter into a meaningful collaboration between a field operator and a console operator, and to establish situational awareness in an area of the system occupied by a particular field operator.

The distance to define which equipment is "proximate" equipment can be set by engineering or management of the system or plant. In practice the proximate equipment may be an entire process unit, in which case working out which equipment is proximate to the field operator's current location is fairly straightforward and can be based simply on the nearest equipment. The configuration information for the equipment and process event data is then automatically presented or is automatically made available by the appearance of a menu within a display screen viewable by the console operator. Automatic menu presentation has the advantage of awaiting an action on the part of the console operator to call up the information related to field operator's location, because the console operator may be concentrating on another matter when the field operator's call comes in and may not be able to switch his or her context immediately.

BRIEF DESCRIPTION OF THE DRAWINGS

FIG. 1 is a flow chart that shows steps in a method of operating a physical plant that runs a physical process involving collaboration between a console operator and a field operator, where the collaboration is enhanced by selected system data presented to the console operator based on the current location of the field operator, according to an example embodiment.

DETAILED DESCRIPTION

Figure 2:
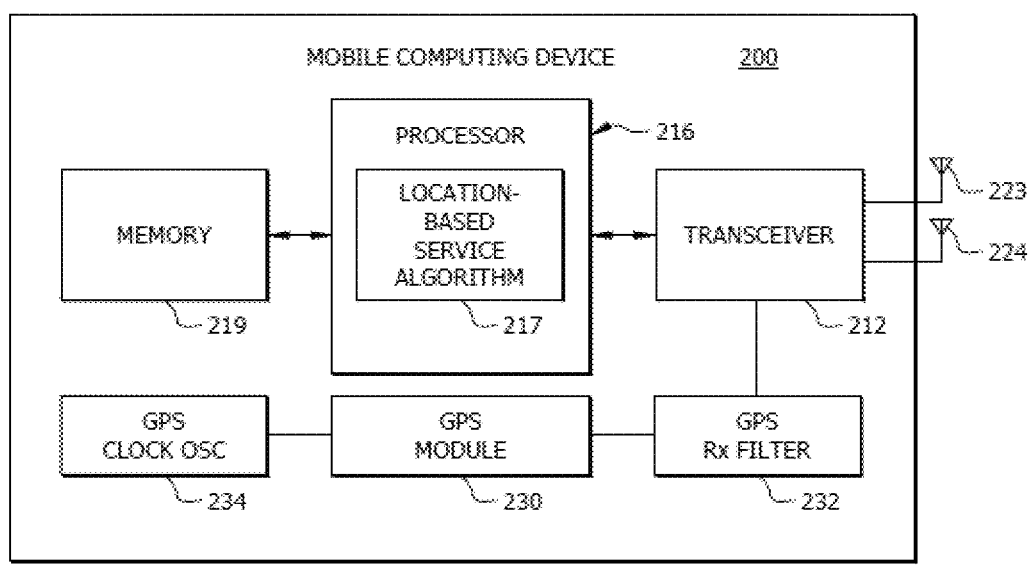
FIG. 2 is a block diagram depiction of an example handheld computing device having a global positioning system (GPS) that provides location information of field operators, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

FIG. 1 is a flow chart that shows steps in an example method 100 of operating a physical system (e.g., industrial plant) that runs a physical process involving collaboration between a console operator and a field operator, where the collaboration is enhanced by selected system data presented to the console operator based on the current location of the field operator, according to an example embodiment. Step 101 comprises the field operator sending a wireless message that reaches the console operator. The wireless message can directly reach the console operator, or reach the console operator after receipt by a network server having a wireless receiver. In one embodiment the wireless message includes a current location of the field operator. The wireless message can comprise a phone call or a text, for example.

The field operator can be provided a handheld computing device having a wireless transceiver and a processor programmed to implement a location-based service algorithm stored in a memory comprising non-transitory machine readable storage, such as static random access memory (SRAM). In one embodiment, the handheld computing device can be based on the DOLPHIN 9900 mobile computer provided by Honeywell International. The location-based service algorithm wirelessly obtains location information that identifies a current location of the field operator, and can add the location information to wireless transmissions of information from the field operator to the console operator or others in the system, or to the network server serving the system.

The handheld computing device can include a global positioning system (GPS). As known in the art, a GPS is a space-based satellite navigation system that provides location and time information where there is an unobstructed line of sight to four (4) or more GPS satellites. Alternatively, the handheld computing device can calculate the current location of the field operator from timing information including timing information obtained from the network server, such as based on Timing Measurement Action (TMA) frames (e.g., as disclosed in the IEEE 802.11v specification). However, the determination of the current location of the field operator need not be based on timing information. For example, Wi-Fi may use a known mechanism to calculate location that is not based on timing information.

Another source of location information that can be useful for field operators can be based on barcode reading when barcodes are distributed throughout the system/industrial plant, which can provide the location information for equipment in the system or plant including the processing units. In this embodiment, the handheld computing device includes a camera and software for reading the bar code image data sensed by the camera. The bar code can provide location information. Similarly, another source of location information useful for the worker can be provided by radio-frequency identification (RFID) tags when the equipment includes RFID tags. In this embodiment, the handheld device includes RFID reader software.

Step 102 comprises responsive to receiving the wireless message, reading selected information from a system database including both configuration information for the equipment and process event data obtained from or relating to the equipment. The configuration information for the equipment and process event data can be automatically displayed or be automatically made available by a menu within a display screen viewable by the console operator. As described above, menu presentation has the advantage of awaiting an action on the part of the console operator to call up the information related to field operator's location, because the console operator may be concentrating on something else when the field operator's call comes in and may not be able to switch context immediately. The selected information relates to the equipment proximate to the current location of the field operator (proximate equipment) and process event data for the proximate equipment. This allows the control room operator to rapidly determine what is going on proximate to the current location, thus focusing on only a particular part (portion) of the system or plant.

The configuration information can includes schematics of the equipment including process schematics (information arranged according to a physical layout of the system) and flow sheets reflecting an order of process steps for the physical process run by the system or plant. Examples of configuration information are Piping and Instrument Diagrams (P&IDs), Process Flow Diagrams (PFD), Material Safety Data Sheets (MSDS), and Maintenance Data Sheets. This information is largely static reference data.

The process event data can include alarm summaries for the equipment, maintenance data for the equipment including notifications of equipment or process status changes, and process data (e.g., temperature and pressure readings including real or near real-time data) including trends obtained during operation including a historical database for the process data obtained from the equipment, typically from sensors (a "data historian"). Process data may be presented in process schematics which refer to stylized diagrams similar to P&IDs and PFDs that show current, live, updating and historical data.

Further, the "process event data" or "process data" may be in the form of log messages, incident data, sensor data or the like, originating from physical processes. Process data may include a scalar or array value, a date/time stamp, an error message or other data surrounding the process being monitored. Process event data may be in the form of a text message, image, audio or video. Process event data can include data obtained from fixed video cameras which are cameras mounted permanently in place to provide video coverage of a particular part of the system or plant. The fixed video cameras may include pan, tilt, zoom capability. Fixed video cameras are in contrast to mobile video cameras that may be carried by field operators. In one embodiment the console operator initiates a query on a touch sensitive screen of a display device using the current location of the field worker depicted within a depiction of the system to generate the selected information.

Step 103 comprises displaying the selected information on a display device for viewing by the console operator which provides the console operator situational awareness proximate to the current location. The display device can generate at least one graphical user interface (GUI), such as GUI images, icons or widgets, and other visual indicia that display process data garnered from the processes being controlled for viewing by the console operator. The display may be provided by a computer system having a processor, and user input devices, such as a keyboard, mouse, touch screen and/or a microphone.

Step 104 comprises the console operator providing information relevant to the current location to the field operator to complete a collaboration with the field operator. Typically, after receiving the information relevant to the current location the field operator performs at least one action guided at least in part by this information.

The network server can include memory to provide the system database. The system database can maintain current location information for each of the plurality of field operators.

FIG. 2 is a block diagram depiction of an example handheld computing device 200 having a GPS that provides location-based services, according to an example embodiment. Computing device 200 includes a processor 216 programmed to implement a location-based service algorithm 217 stored in non-transitory machine readable storage shown as memory 219. The location-based service algorithm 217 is operable to obtain location information for the handheld computing device involved in operating a physical system or industrial plant (e.g., see industrial plant 300 shown in FIG. 3 described below) having processing units (equipment) and a wireless network including a network server, at least one router, and a plurality of workers including a first worker having a disclosed handheld computing device. The location-based service algorithm 217 adds location information for the handheld computing device 200 automatically to wireless transmissions of information by the first field operator to other plant workers and/or to the network server.

Handheld computing device 200 includes a wireless transceiver 212. The transceiver 212 is coupled to an antenna 223. Handheld computing device 200 also includes a GPS clock oscillator 234 coupled to GPS module 230, where the GPS module 230 is coupled to the transceiver 212 through GPS Rx filter 232, and the transceiver 212 is also coupled to a GPS antenna 224.

Figure 3:
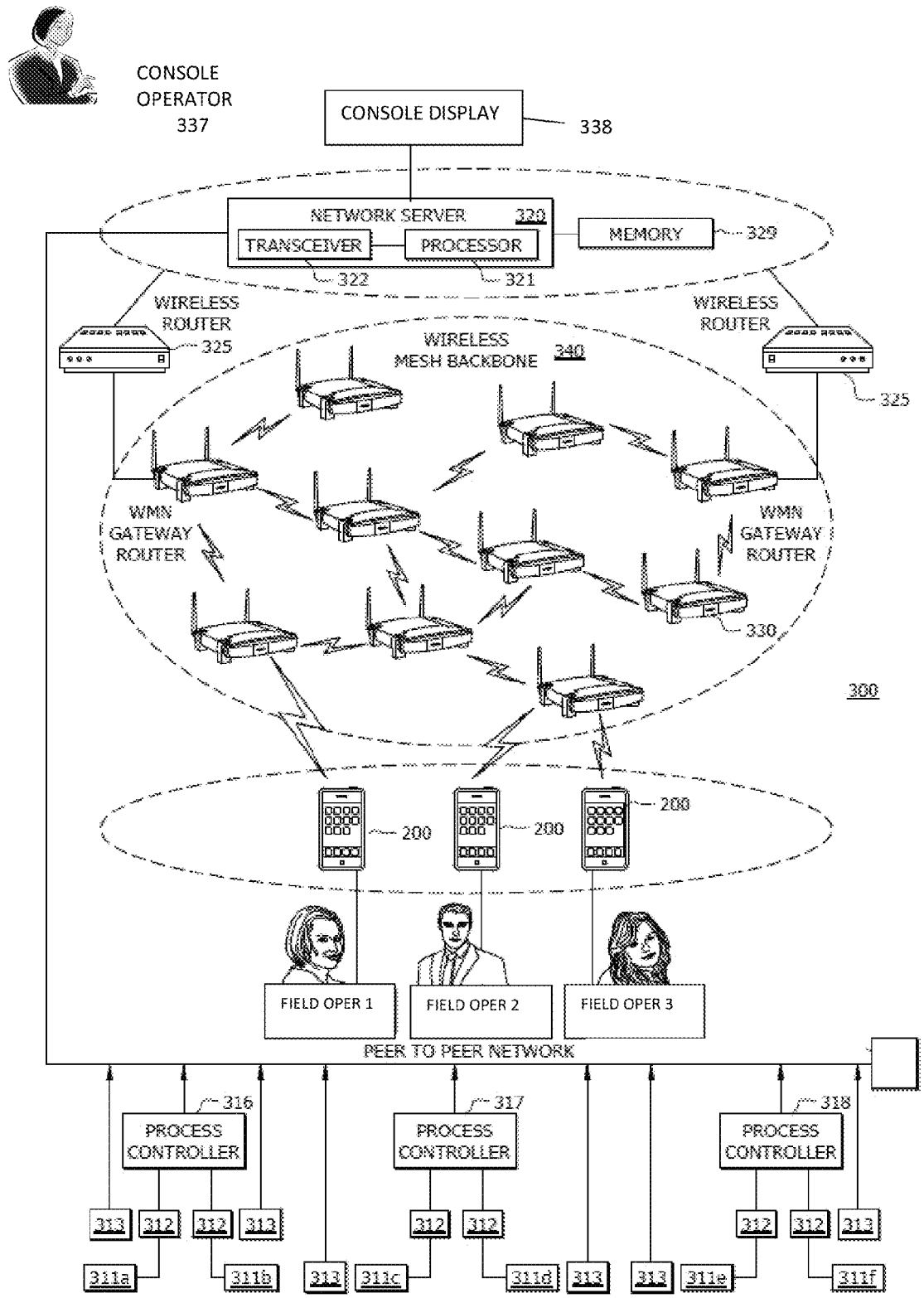
FIG. 3 is a block diagram of a physical system comprising processing units, along with a wireless communications network including a network server, at least one router, and a plurality of field operators having handheld computing devices that provides their location information, according to an example embodiment.

FIG. 3 is a block diagram of an industrial plant 300 comprising equipment/processing units 311a-f, and actuators 312, and sensors 313 coupled to the processing units, along with a wireless communications network including a network server 320, at least one router shown as wireless routers 325 and gateway routers 330 arranged in a wireless mesh backbone 340. A plurality of field operators shown as field operators 1, 2 and 3 each having a disclosed handheld computing device 200 are shown, as well as a console operator 337 positioned to view a console display 338 that is coupled to the network server 320.

As described above relative to FIG. 2, handheld computing devices 200 include a wireless transceiver and a processor programmed to implement a disclosed location-based service algorithm stored in non-transitory machine readable storage. The location-based service algorithm obtains location information that identifies a current location for the field operator, and adds the current location information to wireless transmissions of information by the field operator to other field operators, console operators and/or to the network server 320. The network server includes a processor 321 and a wireless transceiver 322 for wirelessly sending plant information to the handheld computing device that is a function of the current location of the operator, and is coupled to memory 329 which can store the system database. The system database includes information for equipment in the industrial plant 300 and process event data obtained from or relating to the equipment.

Industrial plant 300 is shown configured as a distributed control system (DCS) where the controller elements 316-318 are not central in location, but are rather distributed throughout the plant with each component sub-system controlled by one or more controllers. Industrial plant 300 can implement a wide variety of activities, such as oil refining, petrochemicals, central station power generation, fertilizers, pharmaceuticals, food and beverage manufacturing, cement production, steelmaking, papermaking, and gas processing.

The network server 320 can include a data historian stored in memory 329 so that the server provided plant information provides historical data from the data historian about the particular equipment that is proximate (e.g., proximate can be set be a preprogrammed maximum distance) to the current location of the field operator. Such location information can facilitate certain on the spot decision making by console operator 337.

When one of the field operators sends an observation or notification, as noted above, the location information can be automatically added to the transmission. For example, in a long pipeline, if a leakage is found, the location of the leak can be helpful to arrest the leakage. Further, location information can be helpful for scaffolding and flow measurements and radiography. Similarly, when a field operator stands at a given location and requests the history of all the changes that happened at that location, the console operator can quickly list the equipment for which the history is relevant, and can display the maintenance/equipment history for such equipment.

Figure 4:
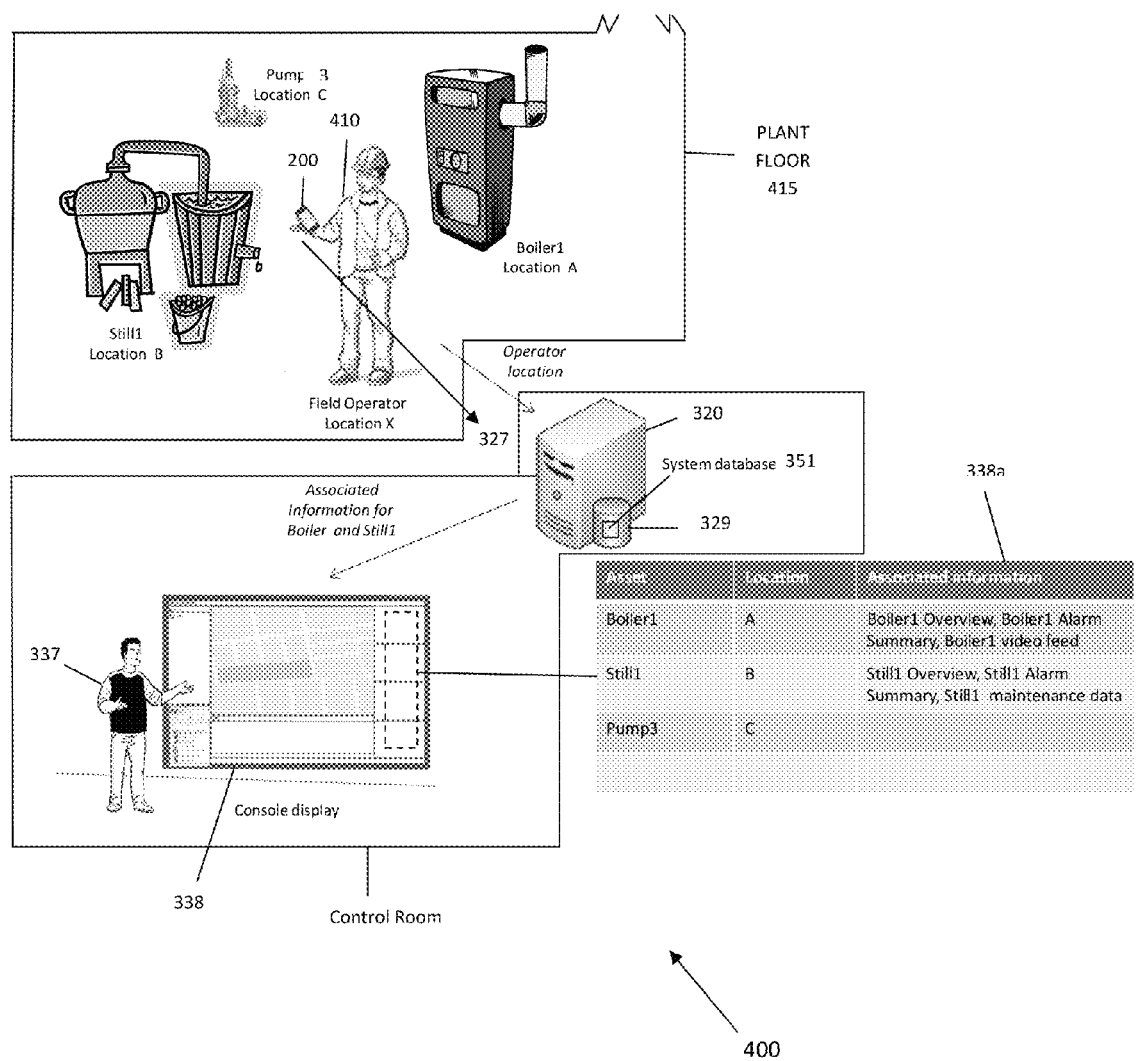
FIG. 4 is a simplified depiction that shows a field operator within a plant floor of an industrial plant having a handheld computing device that provides their current location information that is used to select information to display to a console operator viewing a console display in a control room of the industrial plant.

FIG. 4 is a simplified depiction 400 that shows a field operator 410 within a plant floor 415 of an industrial plant having a handheld computing device 200, and a console operator 337 viewing a console display 338 in a control room 340 of the industrial plant. The field operator 410 is shown at location X on the plant floor 415. The equipment/assets on the plant floor 415 shown in FIG. 4 include boiler 1 at location A, still 1 at location B, and pump 3 at location C.

The field operator 410 is shown sending a wireless message via handheld computing device 200 which is received by the antenna 327 of the network server 320. A disclosed algorithm implemented by network server 320 utilizes a system database 351 which includes information for the equipment (shown as assets) in the industrial plant including the locations and process event data obtained from or relating to the equipment, and based on the current location of the field operator 410, determines boiler 1 at location A and still 1 at location B are the only proximate equipment on the plant floor 415. Other equipment on the plant floor 415 that is further then a threshold distance from the current location of the field operator 410, including pump 3 at location C, are not determined to be proximate equipment. A menu within a portion 338a of the console display 338 shows the associated information available for boiler 1 and still 1 for viewing upon selection by the console operator 337, while there is no information shown for pump 3 at location C on the menu since pump 3 at location C is not proximate to the current location of the field operator 410.

The console operator 337 may then provide information relevant to the current location to the field operator 410 to complete a collaboration with the field operator 410. Typically, after receiving the information relevant to the current location the field operator 410 performs at least one action guided at least in part by this information.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized as the non-transitory machine readable storage media. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The Disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a physical computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

We claim:

1. A method of operating a physical system that runs a physical process involving a console operator and a plurality of field operators including a first field operator, comprising:
   said first field operator sending a wireless message that reaches said console operator;
   responsive to said wireless message, reading selected information from a system database including configuration information for equipment in said physical system and process event data obtained from or relating to said equipment, said selected information including said equipment which is proximate to a current location of said first field operator (proximate equipment) and process related data from said proximate equipment; and
   displaying said selected information on a display device viewable by said console operator.

2. The method of claim 1, wherein said wireless message includes said current location and wherein said console operator transmits information relevant to said current location to said first field operator.

3. The method of claim 1, wherein said physical system includes a network server including said system database which maintains current location information for said plurality of field operators.

4. The method of claim 1, further comprising said console operator initiating a query on said system database using a screen of said display device depicting said current location on said screen to generate said selected information.

5. The method of claim 1, wherein said first field operator has a handheld computing device including a wireless transceiver, a memory comprising non-transitory machine readable storage having a location-finding algorithm, and a processor programmed to implement said location-finding algorithm for identifying said current location.

6. The method of claim 5, wherein said handheld computing device includes a Global Positioning System (GPS) that provides said current location.

7. The method of claim 5, wherein said physical system includes a network server including said system database, and wherein said handheld computing device calculates said current location information from transmissions to and from said network server.

8. The method of claim 1, wherein said current location is automatically added to said wireless message.

9. The method of claim 1, wherein said system database includes schematics of said equipment, alarm summaries for said equipment, maintenance data for said equipment, and a historical database for said process event data obtained from said equipment.

10. The method of claim 1, wherein said display device provides at least one graphical user interface (GUI).

11. The method of claim 1, wherein said configuration information includes information arranged according to a physical layout of said physical system or as a flow sheet reflecting an order of process steps for said physical process run by said physical system.

12. A physical system that runs a physical process, comprising:

a control console including a display device coupled to a wireless receiver for receiving a wireless message from a field operator within said physical system;

a memory comprising machine readable storage storing a system database including information for equipment in said physical system and process event data obtained from or relating to said equipment; and a processor communicably coupled to said memory programmed to read selected information from said system database including configuration information for equipment in said physical system and process event data obtained from or relating to said equipment, said selected information including said equipment which is proximate to a current location of a first field operator (proximate equipment) and said process event data for said proximate equipment, wherein said display device is coupled to said processor for displaying said selected information for viewing by a console operator.

13. The controlled system of claim 12, wherein said wireless message from said first field operator includes said current location of said field operator; and said processor is programmed to decode said current location from said wireless message.

14. The controlled system of claim 12, wherein said system database includes schematics of said proximate equipment, alarm summaries for said proximate equipment, maintenance data for said proximate equipment, and a historical database for process related data from said proximate equipment.

15. The controlled system of claim 12, wherein said field operator has a handheld computing device including a wireless transceiver, a memory comprising non-transitory machine readable storage, and a Global Positioning System (GPS) that provides said current location.

16. The controlled system of claim 12, wherein said configuration information includes information arranged according to a physical layout of said physical system or as a flow sheet reflecting an order of process steps for said physical process.

17. Machine readable storage, comprising:

a non-transitory machine readable storage media having code stored therein, said code including executable instructions, which, when executed by a computing device, cause the computing device to implement a desktop environment for a physical system that runs a physical process, said code including:

code for triggering a reading operation responsive to a wireless message received from a first field operator, said reading operation reading selected information from a system database including configuration information for equipment in said physical system and process event data obtained from or relating to said equipment, said selected information including said equipment which is proximate to a current location of said first field operator (proximate equipment) and process related data from said proximate equipment; and code for displaying said selected information on a display device viewable by a console operator.

18. The machine-readable storage medium of claim 17, wherein said wireless message includes said current location and said code further includes code for decoding said current location from said wireless message.

19. The machine-readable storage medium of claim 17, wherein said system database includes schematics of said equipment, alarm summaries for said equipment, maintenance data for said equipment, and a historical database for said process event data obtained from said equipment.

20. The machine-readable storage medium of claim 17, wherein said configuration information is arranged according to a physical layout of said physical system or as a flow sheet reflecting an order of process steps for said physical process run by said physical system.

* * * * *